(12) United States Patent
Chen et al.

(10) Patent No.: US 11,714,319 B2
(45) Date of Patent: Aug. 1, 2023

(54) DISPLAY DEVICE AND METHOD FOR MANUFACTURING THE SAME

(71) Applicants: Hefei Xinsheng Optoelectronics Technology Co., Ltd., Anhui (CN); BOE TECHNOLOGY GROUP CO., LTD., Beijing (CN)

(72) Inventors: Peng Chen, Beijing (CN); Xinxia Zhang, Beijing (CN); Fengzhen Lv, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/488,537

(22) Filed: Sep. 29, 2021

(65) Prior Publication Data

US 2022/0155646 A1    May 19, 2022

(30) Foreign Application Priority Data

Nov. 18, 2020   (CN) .......................... 202011292623.2

(51) Int. Cl.
  *G02F 1/1343*      (2006.01)
  *G02F 1/1333*      (2006.01)
  (Continued)

(52) U.S. Cl.
  CPC .... *G02F 1/134345* (2021.01); *G02F 1/13394* (2013.01); *G02F 1/13439* (2013.01);
  (Continued)

(58) Field of Classification Search
  CPC ......... G02F 1/134345; G02F 1/133512; G02F 1/13394; G02F 1/13439; G02F 1/136286;
  (Continued)

(56) References Cited

U.S. PATENT DOCUMENTS

2011/0299022 A1* 12/2011 Li ..................... G02F 1/134363
                                            349/143
2017/0102591 A1*  4/2017 Huh .................. G02F 1/133512
                      (Continued)

FOREIGN PATENT DOCUMENTS

CN         101211032 A      7/2008
CN         102253541 A     11/2011
                      (Continued)

OTHER PUBLICATIONS

China Patent Office, CN202011292623.2 First Office Action dated Feb. 11, 2022.

*Primary Examiner* — Mariam Qureshi
(74) *Attorney, Agent, or Firm* — Houtteman Law LLC

(57) ABSTRACT

The disclosure provides a display device and a method for manufacturing the same. The display device includes: an array substrate, an opposite substrate and a liquid crystal layer between the array substrate and the opposite substrate. The array substrate includes a first base, and a first electrode and a second electrode of each of the plurality of sub-pixels, the first electrode and the second electrode being located on a side of the first base proximal to the liquid crystal layer; and the opposite substrate includes: a second base and an interference electrode of each of the sub-pixels, the interference electrode is located on a side of the second base proximal to the liquid crystal layer, orthographic projections of the interference electrode of each sub-pixel and the second electrode of said each sub-pixel on the first base at least partially overlaps.

15 Claims, 7 Drawing Sheets

(51) Int. Cl.
*G02F 1/1335* (2006.01)
*G02F 1/1339* (2006.01)
*G02F 1/1362* (2006.01)
*G02F 1/1341* (2006.01)

(52) U.S. Cl.
CPC .. *G02F 1/133512* (2013.01); *G02F 1/136286* (2013.01); *G02F 1/1341* (2013.01); *G02F 1/133354* (2021.01)

(58) Field of Classification Search
CPC ............. G02F 1/133354; G02F 1/1341; G02F 1/134309; G02F 1/1323; G02F 1/134381; G02F 1/134372
See application file for complete search history.

(56) References Cited

U.S. PATENT DOCUMENTS

| | | | |
|---|---|---|---|
| 2017/0249044 A1* | 8/2017 | Liu | G06F 3/04166 |
| 2019/0163024 A1* | 5/2019 | Tominaga | G02F 1/134309 |
| 2020/0050062 A1* | 2/2020 | Kabe | G02F 1/134363 |

FOREIGN PATENT DOCUMENTS

| | | |
|---|---|---|
| CN | 103091883 A | 5/2013 |
| CN | 103365002 A | 10/2013 |
| CN | 105425480 A | 3/2016 |
| CN | 105807511 A | 7/2016 |
| CN | 106353936 A | 1/2017 |
| CN | 106646936 A | 5/2017 |
| CN | 108508666 A | 9/2018 |
| JP | 2007264320 A | 10/2007 |
| KR | 20060128416 A | 12/2006 |

* cited by examiner

| | ③ | ② | ① |
|---|---|---|---|
| transmittance under driving voltage | 9% | 10% | 12.7% |
| | ref | increased by 11% | 41% |
| driving voltage | 3.6V | 6.0V | 5.4V |
| | ref | increased by 2.4V | increased by 1.8V |
| contrast at a front view angle | 557 | 756 | 891 |
| | ref | increased by 35.7% | increased by 59.9% |
| contrast at view angle of 45 degree — left | 349 | 321 | 362 |
| contrast at view angle of 45 degree — right | 277 | 270 | 322 |

… # DISPLAY DEVICE AND METHOD FOR MANUFACTURING THE SAME

CROSS REFERENCE TO RELATED APPLICATIONS

The present disclosure claims priority to Chinese patent application No. 202011292623.2, filed at the Chinese Intellectual Property Office on Nov. 18, 2020, the disclosure of which is incorporated herein by reference in its entirety.

TECHNICAL FIELD

The present disclosure relates to the field of display technology, in particular to a display device and a method for manufacturing a display device.

BACKGROUND

At present, when a display device is used daily or for processing confidential documents in a meeting scene, the display device needs to be subjected to peep-proof processing. In the related art, a peep-proof film is attached to a display area of the display device for peep-proof, but the peep-proof film may increase a thickness of the display device, and reduce contrast of the display device at each viewing angle, which affects a display effect of the display device.

SUMMARY

An embodiment of the present disclosure provides a display device, including: an array substrate and an opposite substrate which are oppositely arranged, and a liquid crystal layer between the array substrate and the opposite substrate, the display device includes a plurality of sub-pixels arranged in an array, where the array substrate includes a first base, and a first electrode and a second electrode of each of the plurality of sub-pixels, the first electrode and the second electrode are located on a side of the first base proximal to the liquid crystal layer; and the opposite substrate includes a second base and an interference electrode of each of the sub-pixels, where the interference electrode is located on a side of the second base proximal to the liquid crystal layer, and an orthographic projection of the interference electrode of each sub-pixel on the first base at least partially overlaps an orthographic projection of the second electrode of said each sub-pixel on the first base.

In some implementations, the first electrode in the sub-pixel is a plate-shaped electrode, and the second electrode is a slit electrode; the first electrode and the second electrode are sequentially arranged along a direction departing from the first base; the slit electrode includes a main portion and at least one opening portion; and where the orthographic projection of the interference electrode in the sub-pixel on the first base at least partially overlaps an orthographic projection of the main portion of the slit electrode on the first base.

In some implementations, the orthogonal projection of the interference electrode in the sub-pixel on the first base does not overlap an orthogonal projection of the at least one opening of the slit electrode on the first base.

In some implementations, the main portion in each of the sub-pixels includes a plurality of main sub-portions, a first connection portion, and a second connection portion; the plurality of main sub-portions are arranged at intervals, first ends of the plurality of main sub-portions are connected through the first connection portion, and second ends of the plurality of main sub-portions are connected through the second connection portion;

the interference electrode in each of the sub-pixels includes at least one interference sub-electrode.

In some implementations, the interference electrode in each of the sub-pixels includes a plurality of interference sub-electrodes; and where the interference sub-electrodes are arranged in one-to-one correspondence with the main sub-portions.

In some implementations, the interference electrode in each of the sub-pixels includes a plurality of interference sub-electrodes; and where any one of the interference sub-electrodes corresponds to one of the main sub-portions, and one of the main sub-portions is located between orthographic projections of any two adjacent ones of the interference sub-electrodes on the first base.

In some implementations, the interference electrode in each of the sub-pixels includes one interference sub-electrode; where, the interference sub-electrode is arranged corresponding to a middle one of the plurality of main sub-portions.

In some implementations, an orthogonal projection of the main sub-portion corresponding to the interference sub-electrode on the first base is located within an orthogonal projection of the interference sub-electrode on the first base.

In some implementations, the plurality of main sub-portions are strip-shaped electrodes; the at least one interference sub-electrode is a strip-shaped electrode, and a direction in which the main sub-portions extend is the same as a direction in which the interference sub-electrode extends.

In some implementations, the display device further includes at least one support structure, the at least one support structure is disposed in one-to-one correspondence with the at least one interference sub-electrode, each support structure is located between the interference sub-electrode corresponding thereto and the second base.

In some implementations, the at least one support structure and the at least one interference sub-electrode corresponding to each other are formed into a single piece.

In some implementations, the opposite substrate further includes a black matrix between the sub-pixels; and where the at least one support structure and the black matrix are formed into a single piece.

In some implementations, the first electrode in the sub-pixel includes a plurality of first sub-electrodes, and the second electrode includes a plurality of second sub-electrodes; the first sub-electrodes and the second sub-electrodes are alternately arranged in a same layer; and where an orthographic projection of the interference electrode in the sub-pixel on the first base at least partially overlaps with an orthographic projection of the first sub-electrode and/or the second sub-electrode on the first base.

An embodiment of the present disclosure provides a method for manufacturing a display device, the display device including: an array substrate and an opposite substrate which are oppositely arranged, and a liquid crystal layer located between the array substrate and the opposite substrate, and the display device includes a plurality of sub-pixels arranged in an array; where the method includes:

manufacturing the array substrate, where the array substrate includes: a first base, and a first electrode and a second electrode of each of the plurality of sub-pixels, the first electrode and the second electrode are located on a side of the first base proximal to the liquid crystal layer; and manufacturing the opposite substrate, where the opposite substrate includes: a second base, and an interference electrode of each of the plurality of sub-pixels, the interference electrode is located on a side of the second base proximal to the liquid crystal layer, and an orthographic projection of the interference electrode of each sub-pixel on the first base at least partially overlaps with an orthographic projection of the second electrode of said each sub-pixel on the first base; and aligning and assembling the array substrate and the opposite substrate into the display device, and filling liquid crystal between the array substrate and the opposite substrate.

DRAWINGS

DETAILED DESCRIPTION

Figure 1:
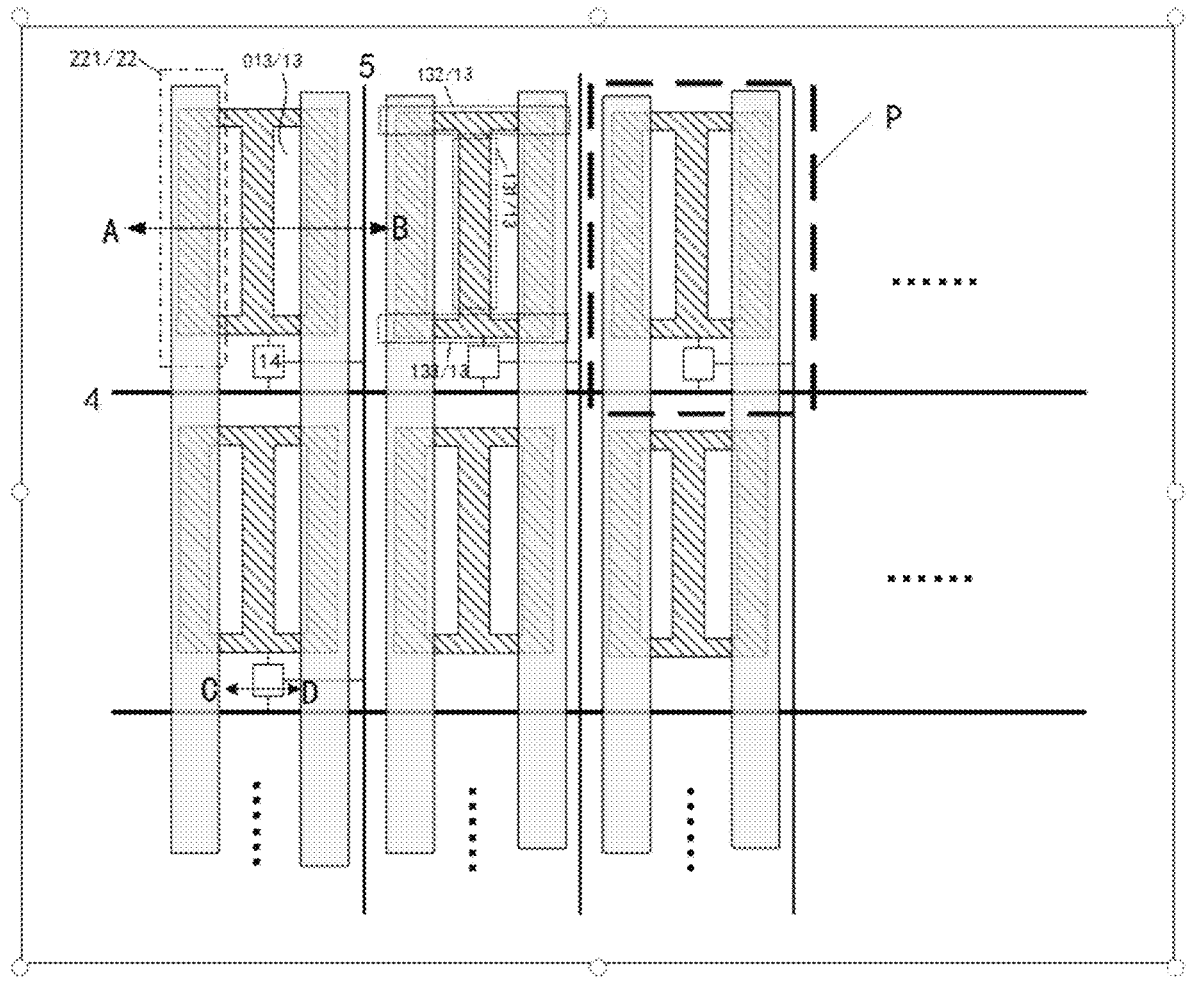
FIG. 1 is a schematic structural diagram (top view) of an implementation of a display device according to an embodiment of the present disclosure.

To make the objects, technical solutions and advantages of the present disclosure more apparent, the present disclosure will be described in further detail with reference to the accompanying drawings, and it is apparent that the described embodiments are only some embodiments of the present disclosure, not all embodiments. All other embodiments, which can be derived by a person skilled in the art from the embodiments disclosed herein without making any creative effort, shall fall within the protection scope of the present disclosure.

The shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which this disclosure belongs. The use of "first," "second," and the like in this disclosure is not intended to indicate any order, quantity, or importance, but rather is used to distinguish one element from another. Also, the use of the terms "a," "an," or "the" and similar referents do not denote a limitation of quantity, but rather denote the presence of at least one. The word "comprising" or "including", and the like, means that the element or item preceding the word includes the element or item listed after the word and its equivalent, but does not exclude other elements or items. The terms "coupled" or "connected" and the like are not restricted to physical or mechanical connections, but may also include electrical connections, whether direct or indirect. Terms "Upper/on", "lower/below", "left", "right", and the like are used only to indicate relative positional relationships, and when the absolute position of the object being described is changed, the relative positional relationships may also be changed accordingly.

It should be noted that, in the display device provided in the embodiment of the present disclosure, an array substrate and an opposite substrate are aligned and assembled to form a display device, the array substrate may include various types of array substrates, the array substrate includes a plurality of driving circuits for sub-pixels, if the array substrate is a color filter on array (COA) substrate, the array substrate may further include color filters. If the array substrate includes the driving circuits and does not include the color filters, the opposite substrate may be a color filter substrate, and if the array substrate is the COA substrate, the opposite substrate may be a packaging substrate, hereinafter, description is made by taking the array substrate including the driving circuits and the opposite substrate being the color filter substrate as an example.

It should be noted that, in the display device provided in the embodiment of the present disclosure, an electric field between a first electrode and a second electrode can control deflection angles of liquid crystal molecules of a liquid crystal layer to adjust light transmittance of the liquid crystal layer for displaying, an arrangement manner of the first electrode and the second electrode and a positional relationship therebetween may be various, that is, the embodiment of the present disclosure may have various driving modes, for example, the first electrode may be arranged on a side of the second electrode proximal to a first base, the first electrode is a plate-shaped electrode, the second electrode is a slit electrode, an electric field around the first electrode is transmitted through slits and interact with an electric field of the second electrode, and the deflection directions of the liquid crystal molecules located near the slits in the liquid crystal layer in the sub-pixel are controlled. For another example, the first electrode may include a plurality of first sub-electrodes, the second electrode may include a plurality of second sub-electrodes, the first sub-electrodes and the second sub-electrodes are alternately disposed and disposed in a same layer, and an electric field formed between the first sub-electrodes and the second sub-electrodes controls deflection directions of liquid crystal molecules of the liquid crystal layer in the sub-pixels. Certainly, the first electrode and the second electrode may also be set in various manners, which are not limited here. In addition, one of the first electrode and the second electrode is a pixel electrode for receiving a data voltage, and the other of the first electrode and the second electrode is a common electrode for receiving a common voltage, hereinafter, description is made by taking the first electrode being the common electrode and the second electrode being the pixel electrode as an example, but the present disclosure is not limited thereto, and the first electrode and the second electrode may be exchanged.

Figure 2:
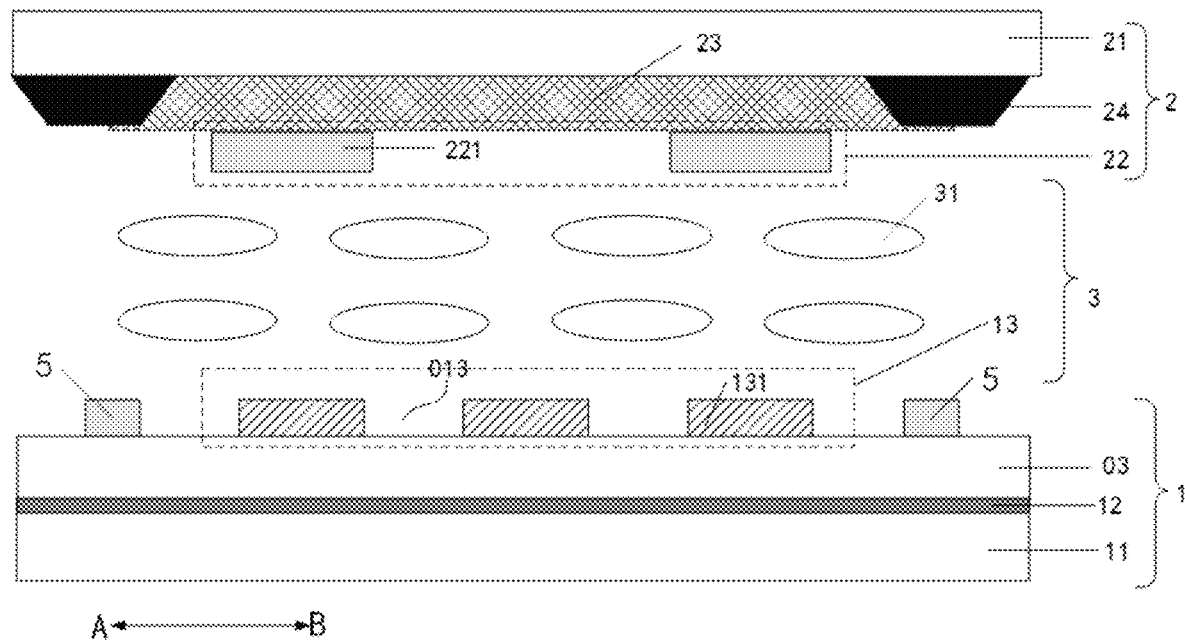
FIG. 2 is a cross-sectional view (along A-B direction) of an implementation of a display device according to an embodiment of the present disclosure.
Figure 3:
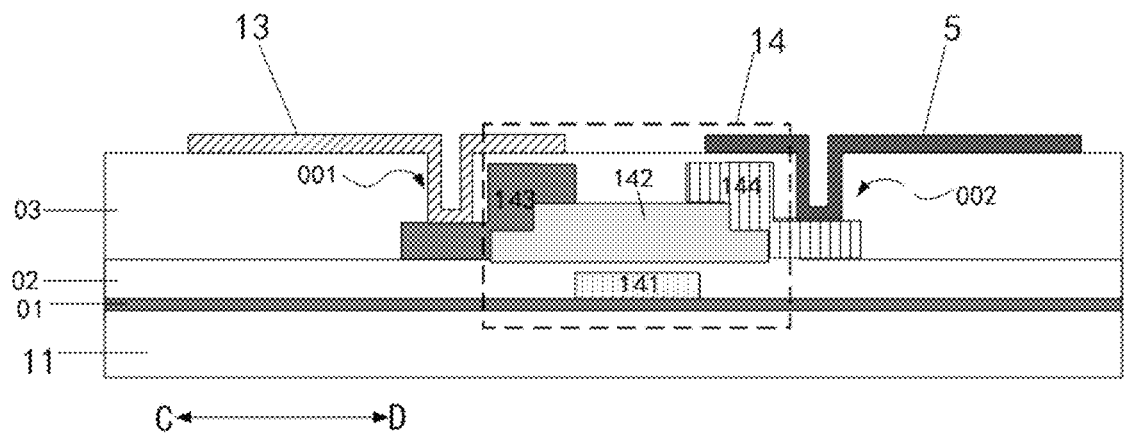
FIG. 3 is a cross-sectional view (along C-D direction) of an implementation of a display device according to an embodiment of the present disclosure.

FIG. 1 is a schematic structural view (top view) of an implementation of a display device according to an embodiment of the present disclosure, FIG. 2 is a cross-sectional view taken along A-B direction of FIG. 1, and FIG. 3 is a cross-sectional view taken along C-D direction of FIG. 1. As shown in FIG. 1 to FIG. 3, the display device provided in the embodiment includes a plurality of sub-pixels P arranged in an array. The display device further includes an array substrate 1 and a color filter substrate 2 which are oppositely arranged, a liquid crystal layer 3 arranged between the array substrate 1 and the color filter substrate 2, and a backlight module (not shown in the drawings).

Specifically, the array substrate 1 includes a first base 11, a common electrode layer 12, a plurality of pixel electrodes 13, and further includes a plurality of gate lines 4, a plurality of data lines 5, and a plurality of thin film transistors 14. The common electrode layer 12, the plurality of pixel electrodes 13, the plurality of gate lines 4, the plurality of data lines 5, and the plurality of thin film transistors 14 are disposed on the first base 11, each sub-pixel P is provided with one of the thin film transistors 14 and one of the pixel electrode 13 therein, and the pixel electrode 13 and the thin film transistor 14 in the same sub-pixel P are electrically coupled to each other. The gate lines 4 extend in a row direction (e.g., a horizontal direction) of the sub-pixels P arranged in the array, the data lines extend in a column direction (e.g., a vertical direction) of the sub-pixels P arranged in the array, the gate lines 4 cross the data lines 5 to define the sub-pixels P. Each gate line 4 is correspondingly coupled to the thin film transistors 14 in one row of the sub-pixels P, and each data line 5 is correspondingly coupled to the thin film transistors 14 in one column of the sub-pixels P. Each gate line 4 is coupled to the pixel electrodes 13 through the thin film transistors 14 in the row of sub-pixels P coupled thereto, the thin film transistors 14 serving as switching devices are turned on or off in response to a scanning signal transmitted through the gate line 4, and if the thin film transistor 14 in the sub-pixel P is turned on, a data voltage on the data line 5 coupled to the thin film transistor 14 can be written into the pixel electrode 13 coupled to the thin film transistor 14. The common electrode layer 12 is disposed on the first base 11, the plurality of pixel electrodes 13 are disposed on a side of the common electrode layer 12 away from the first base 11, and each sub-pixel P is provided with one pixel electrode 13 therein, and in a case where a data voltage is written into the pixel electrode 13, a common voltage is input into the common electrode layer 12, and light from the backlight module is transmitted through the liquid crystal layer 3, an electric field between the common electrode layer 12 and the pixel electrode 13 can control deflection directions of liquid crystal molecules 31 in the liquid crystal layer 3, so that light transmittance of the liquid crystal layer 3 can be controlled.

Figure 4:
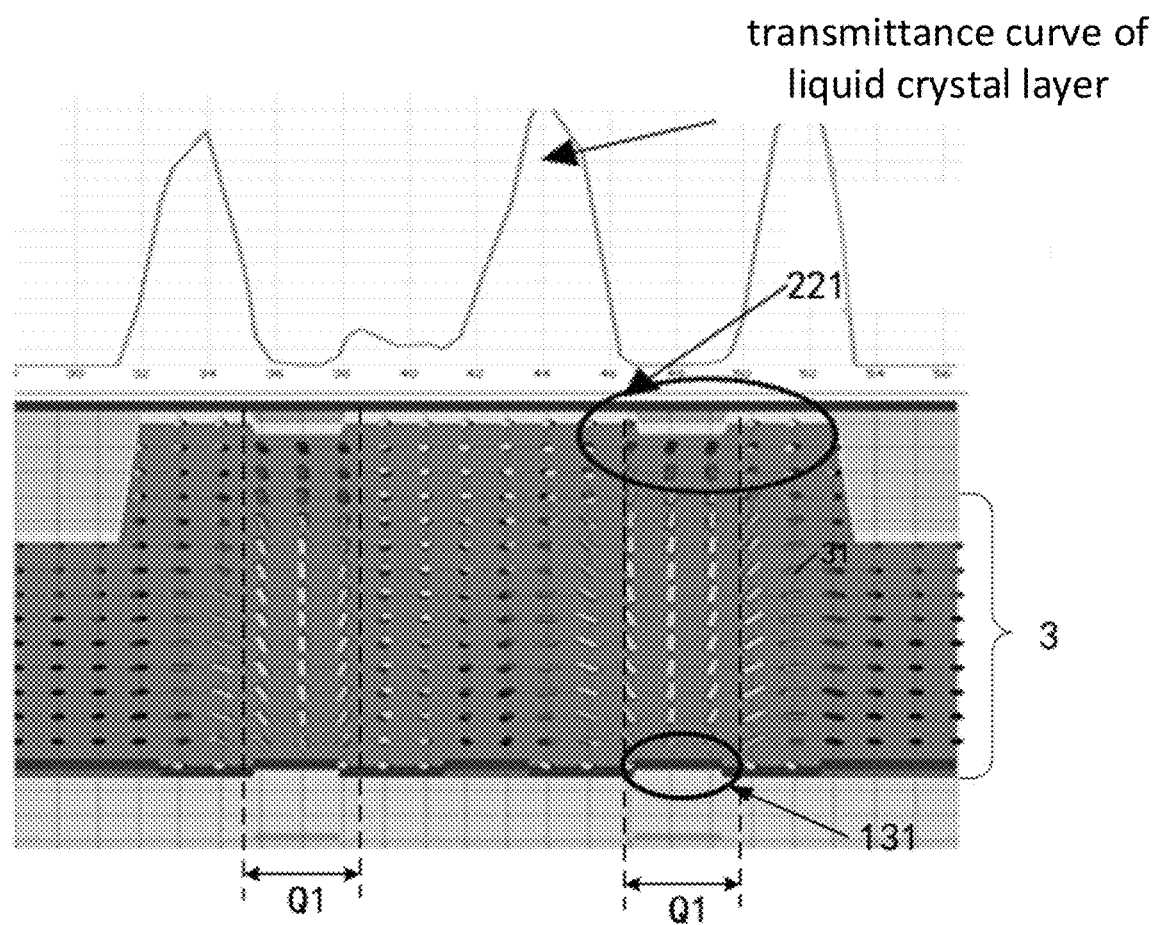
FIG. 4 is a schematic diagram illustrating deflection of liquid crystal molecules in a display device according to an embodiment of the present disclosure.

Further, referring to FIGS. 1-2 and 4, the color filter substrate 2 may include a second base 21, a color filter 23, a black matrix 24 and a plurality of interference electrodes 22. The color filter 23 includes filters of various colors, for example, filters of three colors including red, green and blue, and accordingly, the light from the backlight module passes through the color filter and is filtered into red, green and blue light, certainly, the color filter may also include filters of more colors, which are not limited here. The color filter 23 is disposed in the sub-pixel P, and the black matrix 24 is distributed between the sub-pixels P to separate adjacent sub-pixels P, so as to prevent crosstalk of light from occurring in the adjacent sub-pixels P. The plurality of interference electrodes 22 are disposed on a side of the second base 21 proximal to the array substrate 1, specifically, each sub-pixel P is provided with one interference electrode 22 therein, and the interference electrode 22 may be disposed on a side of the color filter 23 proximal to the array substrate 1. An orthogonal projection of the interference electrode 22 of each sub-pixel P on the first base 11 at least partially overlaps an orthogonal projection of the pixel electrode 13 of said each sub-pixel P on the first base 11 to form an overlapping portion, the overlapping portion is called an overlapping region Q1, the common electrode 12 is disposed on a side of the pixel electrode 13 proximal to the first base 11, the electric field formed between the common electrode 12 and the pixel electrode 13 can control the deflection directions of the liquid crystal molecules 31 in the liquid crystal layer 3, so as to control the transmittance of the liquid crystal layer 3 for normally displaying a picture, while an electric field between the interference electrode 22 and the pixel electrode 13 in the overlapping region Q1 can control the deflection directions of the liquid crystal molecules 31 of the liquid crystal layer 3 in the overlapping region Q1, so that a long axis direction of the liquid crystal molecules 31 of the liquid crystal layer 3 in the overlapping region Q1 is substantially perpendicular (including perpendicular or approximately perpendicular) to the first base 11, so as to reduce the transmittance of a portion of the liquid crystal layer 3 in the overlapping region Q1, therefore, when the display device is observed at a side viewing angle, the light transmittance of the display device is greatly reduced, the contrast is reduced, and the displayed picture of the display device cannot be seen clearly, so that the peep-proof effect is achieved.

Specifically, referring to FIG. 4, the electric field between the interference electrode 22 and the pixel electrode 13 can adjust the deflection directions of the liquid crystal molecules 31 of the liquid crystal layer 3 in the overlapping region Q1 of the interference electrode 22 and the pixel electrode 13, so that the long axes of the liquid crystal molecules 31 are substantially perpendicular to the first base 11, thus the electric field between the interference electrode 22 and the pixel electrode 13 can adjust the light transmittance of the portion of the liquid crystal layer 3 in the overlapping region Q1, so that when the display device displays, the light of the backlight module transmits through the liquid crystal layer 3, the liquid crystal molecules 31 of the liquid crystal layer 3 outside the overlapping region Q1 are deflected according to the electric field between the pixel electrode 13 and the common electrode 12 to achieve the normal display effect, and the liquid crystal molecules 31 of the portion of the liquid crystal layer 3 in the overlapping region Q1 are deflected to a substantially perpendicular state according to the electric field between the interference electrode 22 and the pixel electrode 13, so that the light transmittance is reduced, the liquid crystal molecules 31 of the liquid crystal layer 3 in the overlapping region Q1 forms an arrangement with low light transmittance in a direction perpendicular to the first base 11, so that if the display device is observed from a direction forming a side viewing angle with the display surface of the display device, a line of sight would pass through the liquid crystal molecules 31 in the overlapping region Q1, but the arrangement with low light transmittance formed by the liquid crystal molecules 31 in the overlapping region Q1 effectively blocks the line of sight, thereby achieving a peep-proof effect without affecting the display effect of the display device being observed at a front viewing angle. In addition, since the interference electrode 22 is disposed on the side of the second base 21 proximal to the array substrate 1, that is, on an inner side of the color filter substrate 2, a thickness of the color filter substrate 2 is not additionally increased, so that a thickness of the display device is prevented from being increased.

Further, referring to FIG. 3, FIG. 3 is a cross-sectional view taken along a direction C-D of FIG. 1, and it should be noted that the cut in FIG. 3 does not pass through the pixel electrode 13, but in order to shown the position of the pixel electrode 13 in the cross-sectional view, the pixel electrode 13 is shown in FIG. 3. The display device provided by the embodiment is provided with a buffer layer 01 on a side of the first base 11 proximal to the pixel electrode 13, and the thin film transistor 14 is located on a side of the buffer layer 01 proximal to the pixel electrode 13. The thin film transistor 14 may include a plurality of film layers, including, for example, a gate electrode 141 provided on a side of the buffer layer 01 away from the first base 11; an active layer (active area) 142 above the gate electrode 141; a gate insulating layer 02 located between the active layer 142 and the gate electrode 141; a drain electrode 143 and a source electrode 144 on a side of the active layer 142 away from the gate insulating layer 02, the drain electrode 143 and the source electrode 144 being disposed in a same layer; and an interlayer insulating layer 03 between the drain electrode 143 and the active layer 142. The active layer 142 is made of a semiconductor material, such as amorphous silicon, polysilicon, an organic semiconductor material, and the like, which is not limited herein.

Further, referring to FIGS. 1 and 3, the pixel electrode 13 is electrically coupled to the drain electrode 143 of the thin film transistor 14 through a first via hole 001 disposed in the interlayer insulating layer 03, the data line 5 is electrically coupled to the source electrode 144 of the thin film transistor 14 through a second via hole 002 disposed in the interlayer insulating layers 03, and the gate line 4 (not shown in FIG. 3) is electrically coupled to the gate electrode 141 of the thin film transistor 13 and disposed in the same layer as the gate electrode 141. The common electrode 12 may be disposed in the same layer as the active layer 142. It should be noted that, in the display device provided in the embodiment, the data lines 5 and the gate lines 4 may be disposed between any two film layers in the array substrate, which is not limited herein.

In some implementations, the source electrode 144 and the drain electrode 143 of the thin film transistor 14 may include any one of various types of metal materials, such as silver (Ag), copper (Cu), and aluminum (Al). A material of the pixel electrode 13 may include various types of transparent semiconductor materials, for example, Indium Tin Oxide (ITO). Certainly, the materials of the source electrode 144, the drain electrode 143 and the pixel electrode 13 may be other materials, and is not limited herein.

It should be noted that, in the display device provided in the present embodiment, the structure of the thin film transistor 14 may be of various types, and the drawings are only for convenience of description and do not limit the present disclosure.

Further, in the display device provided in the present embodiment, referring to FIG. 2, FIG. 3 to FIG. 9, taking a case where the common electrode 12 and the pixel electrode 13 are disposed in different layers as an example, the common electrode 12 in each sub-pixel P may be a plate-shaped electrode, the pixel electrode 13 may be a slit electrode, and the common electrode 12 and the pixel electrode 13 are sequentially disposed in a direction away from the first base 11, that is, the common electrode 12 is disposed on a side of the pixel electrode 13 away from the liquid crystal layer 3. The slit electrode (i.e., the pixel electrode 13) includes a main portion and an opening portion 013, the opening portion 013 is a slit of the slit electrode, the main portion is a portion where the slit electrode is not hollowed out, and an electric field of the plate-shaped common electrode 12 interacts with an electric field of the main portion by passing through the opening portion 013 to adjust deflection directions of the liquid crystal molecules 31 in a portion of the liquid crystal layer 3 corresponding to the sub-pixel P to perform display. Here, an orthogonal projection of the interference electrode 22 in each sub-pixel P on the first base 11 at least partially overlaps an orthogonal projection of the main portion of the slit electrode (i.e., the pixel electrode 13) of said each sub-pixel P on the first base 11 to form an overlapping portion, and the overlapping portion is referred to as the overlapping region Q1, and the orthogonal projection of the interference electrode 22 on the first base 11 does not overlap an orthogonal projection of the opening portion 013 of the slit electrode on the first base 11. Thereby, the liquid crystal molecules 31 in the portion of the liquid crystal layer 3 in the overlapping region Q1 are deflected to an approximately vertical state in accordance with the electric field between the interference electrode 22 and the pixel electrode 13, and the light transmittance is reduced, the liquid crystal molecules 31 in the portion of the liquid crystal layer 3 in the overlapping region Q1 forms an arrangement of low light transmittance in the direction perpendicular to the first base 11, so that when the display device is viewed from a direction forming a side view angle with the display surface of the display device, the line of sight would pass through the liquid crystal molecules 31 in the overlapping region Q1, but the arrangement of low light transmittance formed by the liquid crystal molecules 31 in the overlapping region Q1 effectively blocks the line of sight, thereby achieving the peep-proof effect, and the orthogonal projection of the interference electrode 22 on the first base 11 does not overlap the orthogonal projection of the opening portion 013 of the slit electrode (i.e., the pixel electrode 13) on the first base 11, so that the electric field of the interference electrode 22 does not affect the electric field between the common electrode 12 and the slit electrode (i.e., the pixel electrode 13), i.e., the display effect of the display device viewed from the front viewing angle cannot be affected.

Further, referring to FIG. 1, if the pixel electrode 13 is a slit electrode, the pixel electrode 13, which is a slit electrode, may include a main portion and an opening portion 013, and the main portion of each slit electrode may include a plurality of main sub-portions 131, a first connection portion 132, and a second connection portion 133. The plurality of main sub-portions 131 are spaced apart from each other, the opening portion 013 is defined by a space between any two adjacent main sub-portions 131, the plurality of main sub-portions 131 may extend in a same direction, the first connection portion 132 and the second connection portion 133 may extend in another direction, the direction in which the plurality of main sub-portions 131 extend intersect the direction in which the first connection portion 132 (and the second connection portion 133) extend, first ends of the plurality of main sub-portions 131 may be connected by the first connection portion 132, second ends of the plurality of main sub-portions 131 may be connected by the second connection portion 133, and the gate lines 4 and the data lines 5 may overlap with any one of the first connection portion 132 and the second connection portion 133 to transmit a pixel voltage to the main portion of the pixel electrode 13.

In the display device provided in the embodiment, the arrangement of the pixel electrode 13 being the slit electrode and the interference electrode 22 may be implemented by various implementations, the larger the area proportion of the interference electrode 22 in the region of the sub-pixel P is, the better the peep-proof effect is, but the contrast may be reduced, therefore, the interference electrode 22 and the pixel electrode 13 may be arranged according to requirements of the display device for the contrast and the peep-proof. The following is an example.

Figure 5:
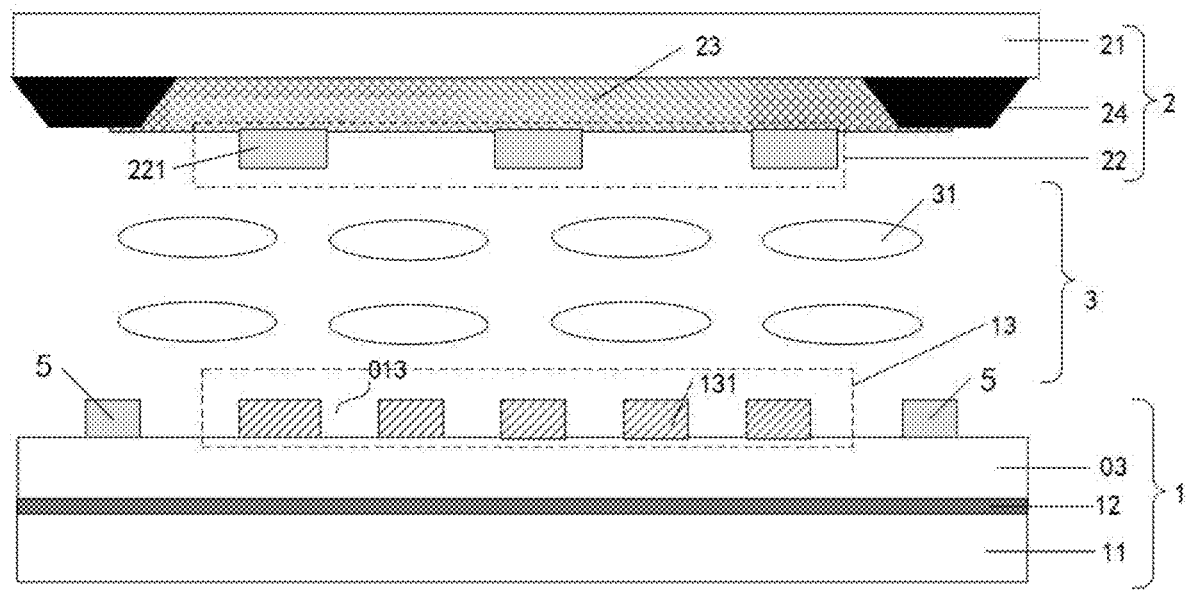
FIG. 5 is a cross-sectional view of an implementation of a display device according to an embodiment of the present disclosure.

Referring to FIGS. 2 and 5, in an implementation of the display device of this embodiment, each pixel electrode 13 on the array substrate 1 is a slit electrode, and includes a main portion and at least one opening portion 013, the main portion includes a plurality of main sub-portions 131, the plurality of main sub-portions 131 are spaced apart from each other, the opening portion 013 is defined between any two adjacent main sub-portions 131, the first ends of the plurality of main sub-portions 131 are connected by the first connection portion 132, and the second ends of the plurality of main sub-portions 131 are coupled by the second connection portion 133.

Further, each of the interference electrodes 22 on the color filter substrate 2 may include a plurality of interference sub-electrodes 221, that is, a plurality of main sub-portions 131 and a plurality of interference sub-electrodes 221 are provided in each sub-pixel P.

Each of the interference sub-electrodes 221 is disposed corresponding to one of the main sub-portions 131, which means that there is an overlapping region between an orthographic projection of the interference sub-electrode 221 on the first base 11 and an orthographic projection of the main sub-portion 131 on the first base 11. Moreover, the interference sub-electrodes 221 are disposed on the side of the second base 21 proximal to the array substrate 1 with one main sub-portion 131 between any two adjacent interference sub-electrodes, that is, for the plurality of interference sub-electrodes 221 in each sub-pixel P, there is one main sub-portion 131 disposed between the orthographic projections of any two adjacent interference sub-electrodes 221 on the first base 11, the main sub-portion 131 is referred to as an intermediate main sub-portion, the orthographic projections of the two adjacent interference sub-electrodes 221 on the first base 11 overlaps with the orthographic projections of the main sub-portions 131 on the first base 11 on both sides of the intermediate main sub-portion respectively to form overlapping regions, the liquid crystal molecules 31 of the liquid crystal layer 3 in the overlapping regions are deflected to an approximately vertical state according to the electric field between the interference sub-electrode 221 and the main sub-portion 131 below the interference sub-electrodes 221, so that the light transmittance is reduced, the peep-proof effect is achieved, and since the interference sub-electrodes 221 are disposed on the side of the second base 21 proximal to the array substrate 1, therefore, the thickness of the color filter substrate 2 is not additionally increased, and the increase of the thickness of the display device is avoided.

Figure 6:
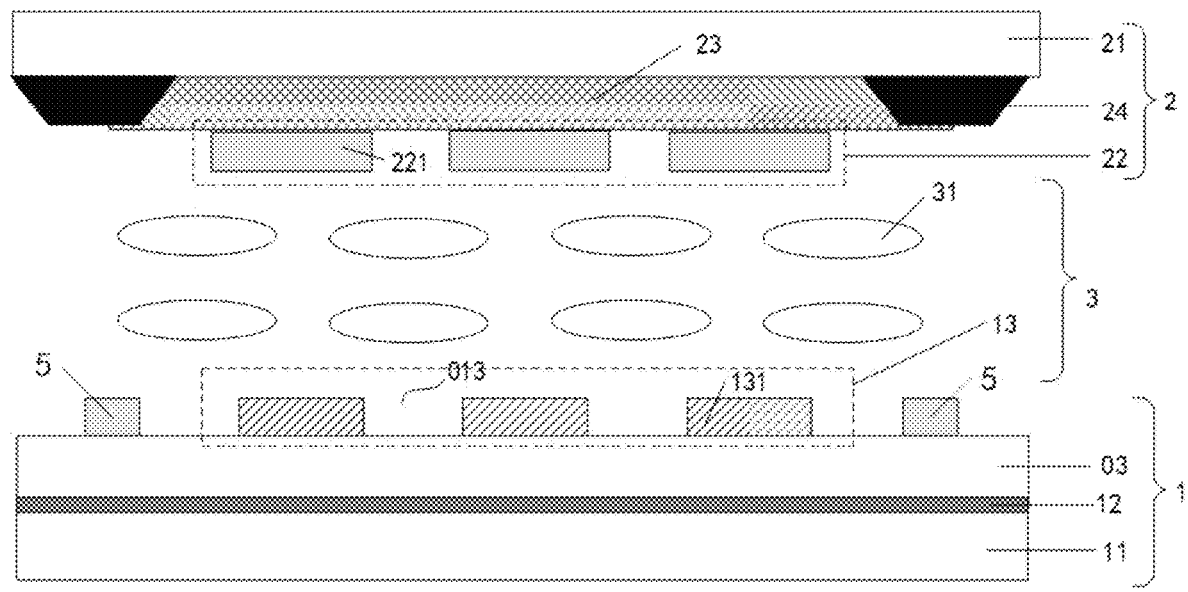
FIG. 6 is a cross-sectional view of an implementation of a display device according to an embodiment of the present disclosure.

Referring to FIG. 6, in an implementation of the display device of this embodiment, each pixel electrode 13 on the array substrate 1 is a slit electrode, and includes a main portion and at least one opening portion 013, the main portion includes a plurality of main sub-portions 131 which are arranged at intervals, the opening portion 013 is defined between any two adjacent main sub-portions 131, the first ends of the plurality of main sub-portions 131 are connected by the first connection portion 132, and the second ends of the plurality of main sub-portions 131 are connected by the second connection portion 133.

Further, each of the interference electrodes 22 on the color filter substrate 2 may include a plurality of interference sub-electrodes 221, that is, a plurality of main sub-portions 131 and a plurality of interference sub-electrodes 221 are provided in each sub-pixel P.

The interference sub-electrodes 221 are disposed in one-to-one correspondence with the main sub-portions 131, that is, there is an overlapping region between the orthographic projection of each interference sub-electrode 221 on the first base 11 and the orthographic projection of one of the main sub-portions 131 on the first base 11, in each sub-pixel P, the number of interference sub-electrodes 221 is the same as the number of main sub-portions 131, that is, there is one of the interference electrodes 221 disposed above each main sub-portion 131, the liquid crystal molecules 31 of the liquid crystal layer 3 between each main sub-portion 131 and the interference electrode 221 corresponding to said each main sub-portion 131 are deflected to an approximately vertical state according to the electric field between the interference sub-electrode 221 and the main sub-portion 131, so that the light transmittance is reduced, the peep-proof effect is achieved, and since the interference sub-electrode 221 is disposed on the side of the second base 21 proximal to the array substrate 1, therefore, the thickness of the color filter substrate 2 is not additionally increased, and the increase of the thickness of the display device is avoided.

Figure 7:
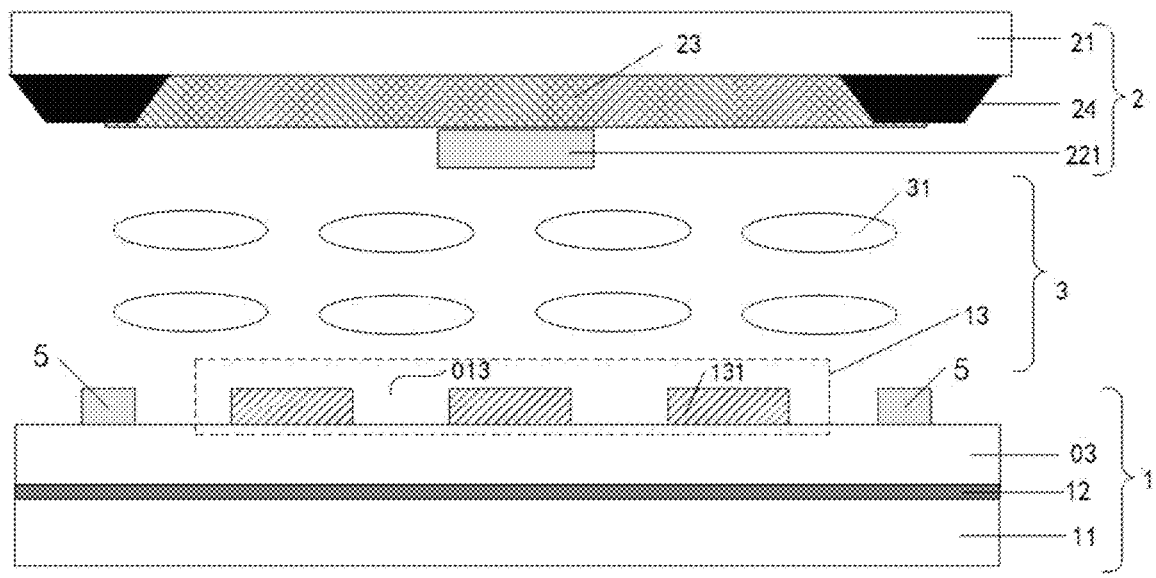
FIG. 7 is a cross-sectional view of an implementation of a display device according to an embodiment of the present disclosure.

Referring to FIG. 7, in an implementation of the display device provided in the embodiment, each pixel electrode 13 on the array substrate 1 is a slit electrode, and includes a main portion and an opening portion 013, the main portion includes a plurality of main sub-portions 131, the plurality of main sub-portions 131 are spaced apart from each other, the opening portion 013 is defined between any two adjacent main sub-portions 131, the first ends of the plurality of main sub-portions 131 are connected by the first connection portion 132, and the second ends of the plurality of main sub-portions 131 are coupled by the second connection portion 133.

Furthermore, each interference electrode 22 on the color filter substrate 2 includes only one interference sub-electrode 221, that is, in each sub-pixel P, a plurality of main sub-portions 131 are provided and only one interference sub-electrode 221 is provided. The interference sub-electrode 221 may be disposed above any one of the plurality of main sub-portions 131 of the pixel electrode 13, and for example, the interference sub-electrode 221 may be disposed corresponding to the main sub-portion 131 located in the middle of the plurality of main sub-portions 131. Taking an example that each pixel electrode 13 on the array substrate 1 includes three main sub-portions 131, the three main sub-portions 131 are sequentially disposed at intervals, the three main sub-portions 131 are respectively a first main sub-portion, a second main sub-portion and a third main sub-portion, the second main sub-portion is located between the first main sub-portion and the third main sub-portion, the second main sub-portion is the main sub-portion located in the middle, and the interference sub-electrode 221 may be disposed corresponding to the second main sub-portion, that is, there is an overlapping region between the orthogonal projection of the second main sub-portion on the first base 11 and the orthogonal projection of the interference sub-electrode 221 on the first base 11, and there is no overlapping region between the orthogonal projection of the first main sub-portion on the first base 11 and the orthogonal projection of the interference sub-electrode 221 on the first base 11, and there is no overlapping region between the orthogonal projection of the third main sub-portion on the first base 11 and the orthogonal projection of the interference sub-electrode 221 on the first base 11. Then, the liquid crystal molecules 31 of the liquid crystal layer 3 between the second main sub-portion and the interference sub-electrode 221 are deflected to an approximately vertical state according to the electric field between the second main sub-portion and the interference sub-electrode 221, so that the light transmittance is reduced, and the peep-proof effect is achieved, and since the interference sub-electrode 221 is disposed on the side of the second base 21 proximal to the array substrate 1, the thickness of the color filter substrate 2 is not additionally increased, and the increase of the thickness of the display device is avoided.

It should be noted that the above embodiment is only an exemplary display device, and the interference electrode 22 and the pixel electrode 13 in the display device provided in the embodiment of the present disclosure may also be arranged in other manners, which are not limited herein.

In some examples, the orthogonal projection of the interference sub-electrode 221 on the first base 11 and the orthogonal projection of the main sub-portion 131 corresponding to the interference sub-electrode 221 on the first base 11 completely coincide.

In some examples, referring to FIGS. 1 to 9, in the display device provided in the embodiment of the present disclosure, an area of the interference electrode 22 may be equal to or slightly larger than an area of the pixel electrode 13, that is, an orthogonal projection of the pixel electrode 13 on the first base 11 is located within the orthogonal projection of the interference electrode 22 disposed opposite to the pixel electrode 13 on the first base 11, in a case where the pixel electrode 13 includes a plurality of main sub-portions 131, the interference electrode 22 includes a plurality of interference sub-electrodes 221, the orthographic projection of the main sub-portion 131 on the first base 11 is located within the orthographic projection of the interference sub-electrode 221 corresponding to the main sub-portion 131 on the first base 11, so that the area of the main sub-portion 131 overlapping the interference sub-electrode 221 can be ensured to be sufficiently large, it is further ensured that the liquid crystal molecules 31 of the liquid crystal layer 3 between the main sub-portion 131 and the interference sub-electrode 221 can be effectively controlled to deflect.

In some examples, as shown in FIG. 1, the pixel electrode 13 may include a plurality of main sub-portions 131, the interference electrode 22 may include a plurality of interference sub-electrodes 221, a shape of each of the main sub-portions 131 may be of various forms, such as a strip, a plate, a comb, and the like, a shape of each of the interference sub-electrodes 221 may also be of various forms, such as a strip, a plate, a comb, and the like, the interference sub-electrodes 221 may be the same as the main sub-portions 131 in the shape and the extending direction, herein, taking the main sub-portions 131 being strip-shaped electrodes and the interference sub-electrodes 221 being strip-shaped electrodes as an example, that is, the extending direction of the main sub-portions 131 may be the same as the extending direction of the interference sub-electrodes 221, for example, as shown in FIG. 1, the main sub-portions 131 extend in the column direction, and then the interference sub-electrodes 221 also extend in the column direction.

Figure 8:
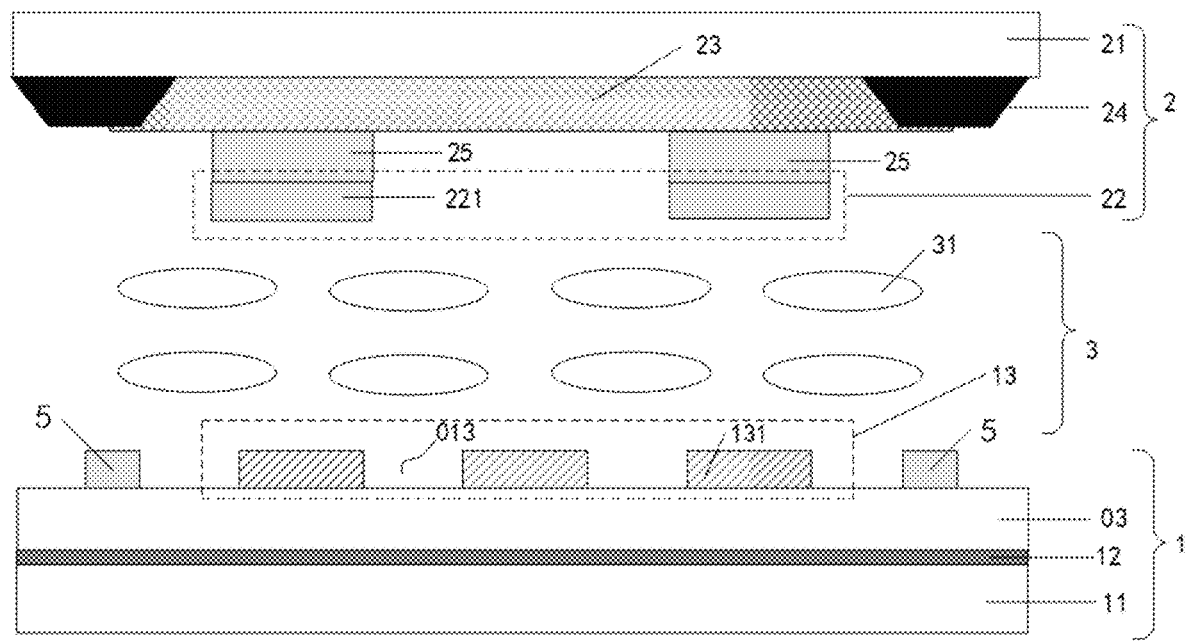
FIG. 8 is a cross-sectional view of an implementation of a display device (with a support structure and an interference electrode being formed into a single piece) according to an embodiment of the present disclosure.
Figure 9:
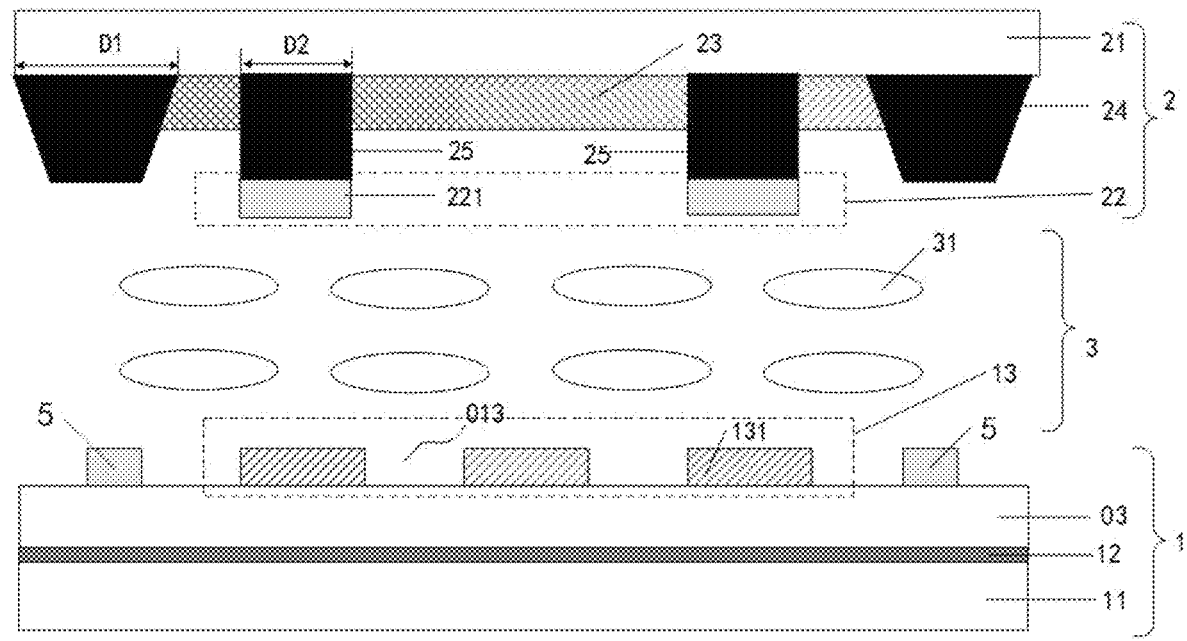
FIG. 9 is a cross-sectional view of an implementation of a display device (with a support structure and a black matrix being formed into a single piece) according to an embodiment of the present disclosure.

In some examples, referring to FIGS. 8 to 9, the display device provided by the present disclosure may further include at least one support structure 25, in a case where the interference electrode 22 includes only one interference sub-electrode 221, one support structure 25 is disposed corresponding to the interference sub-electrode 221, that is, an orthogonal projection of the interference sub-electrode 221 on the second base 21 coincides with an orthogonal projection of the support structure 25 corresponding to the interference sub-electrode 221 on the second base 21; in a case where the interference electrode 22 includes a plurality of interference sub-electrodes 221, a plurality of support structures 25 are disposed in one-to-one correspondence with the plurality of interference sub-electrodes 221, that is, an orthogonal projection of each interference sub-electrode 221 on the second base 21 coincides with an orthogonal projection of the support structure 25 corresponding to said each interference sub-electrode 22 on the second base 21, and the number of interference sub-electrodes 221 is the same as the number of support structures 25 in each sub-pixel P. The support structure 25 is disposed between the second base 21 and the interference sub-electrode 221, and since the interference sub-electrode 221 is disposed in the sub-pixel P in which the color filter 23 is disposed, the support structure 25 is disposed between the color filter 23 and the interference sub-electrode 221, and the support structure 25 can support the interference sub-electrode 221, thereby increasing a height of the interference sub-electrode 221, and reducing a distance between the interference sub-electrode 221 and the main sub-portion 131 of the pixel electrode 13, so that the electric field between the interference sub-electrode 221 and the main sub-portion 131 is enhanced, and the accuracy for controlling the liquid crystal molecules 31 is enhanced.

In some examples, referring to FIG. 8, the support structure 25 may be disposed in various manners, and the support structure 25 may be made of various materials, for example, the support structure 25 and the interference sub-electrode 221 may be formed into a single piece, that is, a film thickness of the interference electrode 22 (interference sub-electrode 221) is increased when the interference electrode 22 (interference sub-electrode 221) is fabricated, so that the distance between the interference electrode 22 (interference sub-electrode 221) and the pixel electrode 13 (main sub-portion 131) is reduced.

In some examples, the interference electrode 22 may be made of various materials, such as ITO (indium tin oxide), and thus the support structure 25 may also be made of ITO.

In some examples, referring to FIG. 9, the support structure 25 may be disposed in other manners, for example, the support structure 25 and a black matrix 24 disposed between the sub-pixels P may be formed into a single piece, that is, a film thickness of the black matrix 24 is increased when the black matrix 24 is manufactured, the black matrix 24 is then patterned, thus the plurality of support structures 25 are formed in the sub-pixels P by the black matrix 24, and the interference sub-electrode 221 is then disposed on the support structure 25, so that the distance between the interference electrode 22 (interference sub-electrode 221) and the pixel electrode 13 (main sub-portion 131) is reduced.

In some examples, a width D2 of the support structure 25 may be smaller than a line width D1 of the black matrix 24, that is, the support structure 25 may be narrower than the line of the black matrix 24 located at the periphery of the sub-pixel P, so as to reduce the influence of the support structure 25 on the transmittance of the sub-pixel P, so that the support structure 25 influences the light emission of the sub-pixel P as little as possible.

In some examples, the disposed position and shape of the common electrode 12 may be various, for example, the common electrode 12 may include a plurality of plate-shaped electrodes, each sub-pixel P is provided with one of the plate-shaped electrodes, and an orthographic projection of each plate-shaped electrode on the first base 11 covers an orthographic projection of the pixel electrode 13 in the sub-pixel P on the first base 11, the plate-shaped electrodes (i.e., the common electrode 12) of the plurality of sub-pixels P are connected by a common electrode line, the common electrode line transmits a common voltage Vcom to the common electrode 12, which includes the plate-shaped electrodes, so that the plate-shaped electrodes serving as the common electrode 12 share a common potential, or the common electrode 12 may include a plurality of strip-shaped electrodes, which are disposed in the same layer as and alternated with the pixel sub-electrodes 131, the strip-shaped electrodes (i.e., the common electrode 12) of the plurality of sub-pixels P are connected by a common electrode line, the common electrode line transmits the common voltage Vcom to the common electrode 12, which includes the strip-shaped electrodes, so that strip-shaped electrodes serving as the common electrode 12 share a common potential, or the common electrode 12 may be a planar electrode, and an orthographic projection of the common electrode 12 on the first base 11 covers the orthographic projections of the pixel electrodes 13 on the first base 11, and the common electrode line is overlapped with the common electrode 12 being the planar electrode, so as to transmit the common voltage Vcom to the common electrode 12. The specific configuration may be set as needed, and is not limited herein.

In some examples, the common electrode 12 may be made of various materials, such as ITO, but other materials may also be used, which is not limited herein.

Figure 10:
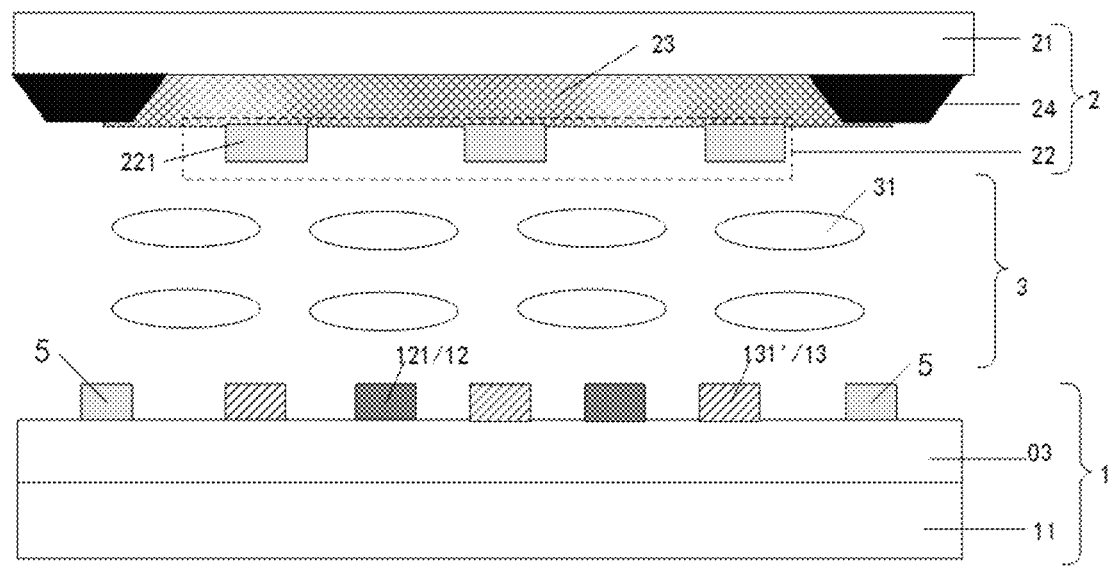
FIG. 10 is a cross-sectional view of an implementation of a display device (with first and second electrodes being disposed in a same layer) according to an embodiment of the present disclosure.

In some examples, referring to FIG. 10, in the display device provided in the embodiment, taking the first electrode being the common electrode 12 and the second electrode being the pixel electrode 13 as an example, the common electrode 12 and the pixel electrode 13 may be disposed in a same layer. Specifically, each sub-pixel P includes one common electrode 12 and one pixel electrode 13, the common electrode 12 may include a plurality of common sub-electrodes 121, the plurality of common sub-electrodes 121 may be strip-shaped electrodes, the pixel electrode 13 may include a plurality of pixel sub-electrodes 131', the plurality of pixel sub-electrodes 131' may also be strip-shaped electrodes, the plurality of common sub-electrodes 121 and the plurality of pixel sub-electrodes 131' may extend along a same direction, and the common sub-electrodes 121 and the pixel sub-electrodes 131' are alternately arranged and disposed at intervals on a side of the first base 11 proximal to the liquid crystal layer 3, that is, each of the common sub-electrodes 121 is adjacent to one of the pixel sub-electrodes 131', and the common sub-electrodes 121 and the pixel sub-electrodes 131' are disposed in a same layer. In the above example, an orthographic projection of the interference electrode 22 on the color filter substrate 2 on the first base 11 may at least partially overlap an orthographic projection of the common sub-electrode 121 and/or the pixel sub-electrode 131' in an arrangement of the common sub-electrode 121, the pixel sub-electrode 131', the common sub-electrode 121 and so on, that are alternately arranged on the first base 11.

Further, as in the above examples, in the example where the common electrode 12 and the pixel electrode 13 are disposed in a same layer, the interference electrode 22, the common electrode 12 and the pixel electrode 13 may be arranged in various manners. For example, the interference electrode 22 may include a plurality of interference sub-electrodes 221, and in each sub-pixel P, the interference sub-electrodes 221 are spaced apart from each other with one of the common sub-electrodes 121 or one of the pixel sub-electrodes 131' therebetween. Alternatively, the interference sub-electrodes 221 are disposed in one-to-one correspondence with the common sub-electrodes 121 and in one-to-one correspondence with the pixel sub-electrodes 131', that is, an orthographic projection of each common sub-electrode 121 on the first base 11 overlaps with an orthographic projection of one of the interference sub-electrodes 221 on the first base 11, and an orthographic projection of each pixel sub-electrode 131' on the first base 11 overlaps with an orthographic projection of one of the interference sub-electrodes 221 on the first base 11. Still alternatively, the interference electrode 22 of each sub-pixel P may have only one interference sub-electrode 221, and the interference sub-electrode 221 is disposed corresponding to a middle common sub-electrode 121 or a middle pixel sub-electrode 131' in the common sub-electrodes 121 and the pixel sub-electrodes 131' alternately disposed on the array substrate 1, that is, an orthographic projection of the interference sub-electrode 221 on the first base 11 overlaps with an orthographic projection of the middle common sub-electrode 121 or the middle pixel sub-electrode 131' on the first base 11. Certainly, there are various ways to arrange the interference electrode 22, the common electrode 12 and the pixel electrode 13, which is not limited herein.

Figure 11:
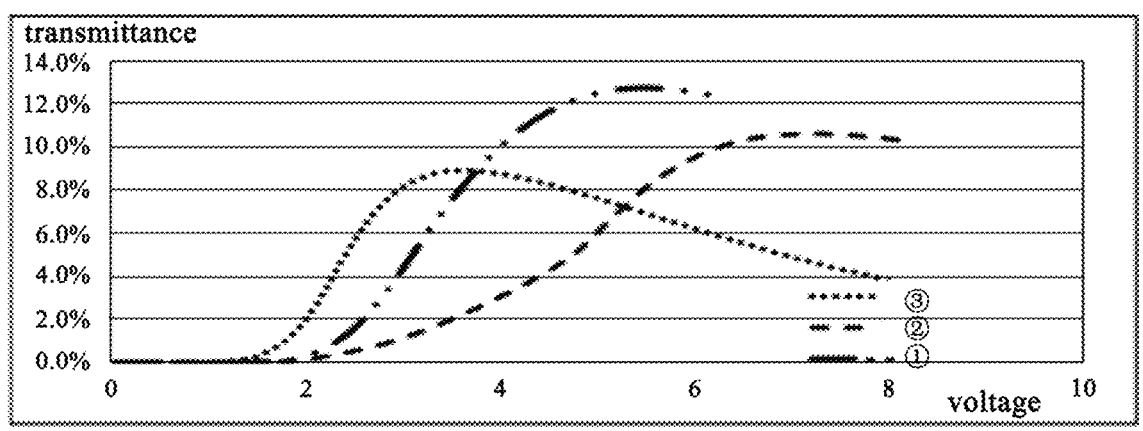
FIG. 11 is a diagram illustrating a voltage-transmittance relationship of a display device according to an embodiment of the present disclosure.
Figures 12, 13:
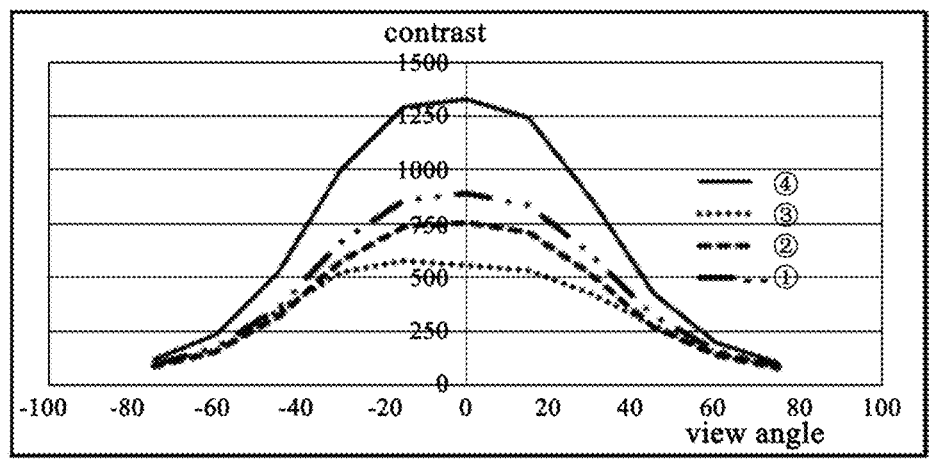
FIG. 12 is a diagram illustrating a view angle-contrast relationship of a display device according to an embodiment of the present disclosure.
FIG. 13 is a parameter table of a display device according to an embodiment of the present disclosure.

Referring to FIG. 11, FIG. 11 is a diagram illustrating voltage-transmittance curves of two implementations of the display device according to the embodiment of the present disclosure and an exemplary implementation, where ① is an implementation corresponding to FIG. 7, ② is an implementation corresponding to FIG. 2, and ③ is an implementation where the interference electrode 22 is a planar electrode covering the entire second base 21. Referring to FIG. 12, FIG. 12 is a diagram illustrating view angle-contrast curves of two implementations of the display device according to the embodiment of the present disclosure and two exemplary implementations, where ① is an implementation corresponding to FIG. 7, ② is an implementation corresponding to FIG. 2, ③ is an implementation in which the interference electrode 22 is a planar electrode covering the entire second base 21, and ④ is an implementation of the display device without the interference electrode 22. Referring to FIG. 13, FIG. 13 is a parameter table for performing a simulation test by using the implementations of ① and ② in FIGS. 11 and 12 as a model, and it can be known from FIGS. 11 to 13 that the display device provided in the embodiment of the present disclosure (taking ① and ② as examples) has relatively high contrast and relatively high light transmittance at a front view angle and can perform good displaying, and has relatively low contrast and relatively low light transmittance at a side view angle (taking a 45° side view angle as an example), thereby achieving a good peep-proof effect without affecting normal displaying.

Note that the driving voltage of the display device in FIG. 13 is only an exemplary driving voltage, and as long as the display device operates at a voltage no less than the driving voltage.

Accordingly, an embodiment of the present disclosure further provides a method for manufacturing a display device, which takes the display device shown in FIG. 2 as an example, and the method may include the following steps S1 to S3.

S1, manufacturing the array substrate 1.

Specifically, the step S1 may include: forming film layers of the thin film transistor 14 on the first base 11, specifically including: manufacturing the buffer layer 01, the gate electrode 141, the active layer 142, the gate insulating layer 02, the drain electrode 143 and the source electrode 144, the interlayer insulating layer 03, and the data line 5 on the first base 11 in this order. Further, the step S1 further includes: forming the common electrode 12 in the film layer where the active layer 142 is located when manufacturing the film layer where the active layer 142 is located; and forming the pixel electrode 131 in the film layer of the data line 5 when the film layer of the data line 5 is manufactured.

S2, manufacturing the color filter substrate 2.

The step S2 may include: forming a material of the black matrix 24 on the second base 21, and forming the black matrix 24 through exposure, development and etching processes; manufacturing color filters 23 in openings of the black matrix 24, more specifically including: manufacturing red (R), blue (B), and green (G) filters; coating an optical adhesive (not shown) on a side of the color filters 23 away from the second base 21 to protect the color filters 23 and form a planarization layer; forming a film layer of the interference electrode 22 on a side of the optical adhesive away from the second base 21, and then performing exposure, development and etching process thereon according to the pattern of the interference electrode 22 to form the pattern of the interference electrode 22 (including a plurality of interference sub-electrodes 221); and coating a frame sealing adhesive (not shown) on the peripheral area of the color filter substrate 2, and a liquid crystal filling opening is reserved in the frame sealing adhesive.

Further, the step S2 may also include: forming a plurality of spacers (not shown) on a side of the black matrix 24 proximal to the liquid crystal layer 3 to support a space between the array substrate 1 and the color filter substrate 2 after the color filter substrate 2 and the array substrate 1 are subsequently aligned and assembled together.

S3, aligning and assembling the array substrate 1 and the color filter substrate 2, and filling the liquid crystal between the array substrate 1 and the color filter substrate 2.

Specifically, in step S3, the array substrate 1 manufactured in the step S1 and the color filter substrate 2 manufactured in the step S2 are aligned and assembled, the array substrate 1 and the color filter substrate 2 are encapsulated together by using a sealant, and liquid crystal molecules 31 are filled between the array substrate 1 and the color filter substrate 2 through the liquid crystal filling opening to form the liquid crystal layer 3, and then the liquid crystal filling opening is sealed to form the display device.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

The invention claimed is:

1. A display device, comprising: an array substrate and an opposite substrate which are oppositely arranged, and a liquid crystal layer between the array substrate and the opposite substrate, the display device comprises a plurality of sub-pixels arranged in an array, wherein
the array substrate comprises a first base, and a first electrode and a second electrode of each of the plurality of sub-pixels, the first electrode and the second electrode is located on a side of the first base proximal to the liquid crystal layer; and
the opposite substrate comprises a second base and an interference electrode of each of the sub-pixels, wherein the interference electrode is located on a side of the second base proximal to the liquid crystal layer, and an orthographic projection of the interference electrode of each sub-pixel on the first base at least partially overlaps an orthographic projection of the second electrode of said each sub-pixel on the first base, wherein the second electrode is a slit electrode; the first electrode and the second electrode are sequentially arranged along a direction departing from the first base; the slit electrode comprises a main portion and at least one opening portion;
the orthographic projection of the interference electrode in the sub-pixel on the first base at least partially overlaps an orthographic projection of the main portion of the slit electrode on the first base;
the main portion in each of the sub-pixels comprises a plurality of main sub-portions, a first connection portion, and a second connection portion; the plurality of main sub-portions are arranged at intervals, first ends of the plurality of main sub-portions are connected through the first connection portion, and second ends of the plurality of main sub-portions are connected through the second connection portion;
the interference electrode in each of the sub-pixels comprises at least one interference sub-electrode, and wherein
the display device further comprises at least one support structure, the at least one support structure is disposed in one-to-one correspondence with the at least one interference sub-electrode, each support structure is located between the interference sub-electrode corresponding thereto and the second base, and the interference sub-electrode is only located on a side of the support structure close to the liquid crystal layer, a border of an orthographic projection of each interference sub-electrode on the second base coincides with a border of an orthographic projection of the support structure corresponding to said each interference sub-electrode on the second base.

2. The display device according to claim 1, wherein the orthogonal projection of the interference electrode in the sub-pixel on the first base does not overlap an orthogonal projection of the at least one opening of the slit electrode on the first base.

3. The display device according to claim 1, wherein
the interference electrode in each of the sub-pixels comprises a plurality of interference sub-electrodes, and wherein
the interference sub-electrodes are arranged in one-to-one correspondence with the main sub-portions.

4. The display device according to claim 3, wherein an orthogonal projection of the main sub-portion corresponding to the interference sub-electrode on the first base is located within an orthogonal projection of the interference sub-electrode on the first base.

5. The display device according to claim 3, wherein the plurality of main sub-portions are strip-shaped electrodes; the interference sub-electrodes are strip-shaped electrodes, and a direction in which the main sub-portions extend is the same as a direction in which the interference sub-electrodes extend.

6. The display device according to claim 1, wherein
the interference electrode in each of the sub-pixels comprises a plurality of interference sub-electrodes; and wherein
any one of the interference sub-electrodes corresponds to one of the main sub-portions, and one of the main sub-portions is located between orthographic projections of any two adjacent interference sub-electrodes on the first base.

7. The display device according to claim 6, wherein an orthogonal projection of the main sub-portion corresponding to the interference sub-electrode on the first base is located within an orthogonal projection of the interference sub-electrode on the first base.

8. The display device according to claim 6, wherein the plurality of main sub-portions are strip-shaped electrodes; the interference sub-electrodes are strip-shaped electrodes, and a direction in which the main sub-portions extend is the same as a direction in which the interference sub-electrodes extend.

9. The display device according to claim 1, wherein
the interference electrode in each of the sub-pixels comprises one interference sub-electrode; wherein,
the interference sub-electrode is arranged corresponding to a middle one of the plurality of main sub-portions.

10. The display device according to claim 9, wherein an orthogonal projection of the main sub-portion corresponding to the interference sub-electrode on the first base is located within an orthogonal projection of the interference sub-electrode on the first base.

11. The display device according to claim 9, wherein the main sub-portions are strip-shaped electrodes; the interference sub-electrode is a strip-shaped electrode, and a direction in which the main sub-portions extend is the same as a direction in which the interference sub-electrode extends.

12. The display device according to claim 1, wherein the at least one support structure and the at least one interference sub-electrode corresponding to each other are formed into a single piece.

13. The display device according to claim 1, wherein the opposite substrate further comprises a black matrix between the sub-pixels; and wherein
the at least one support structure and the black matrix are formed into a single piece.

14. The display device according to claim 1, wherein the first electrode comprises a plurality of first sub-electrodes, and the second electrode comprises a plurality of second sub-electrodes; the first sub-electrodes and the second sub-electrodes are alternately arranged in a same layer; and wherein
an orthographic projection of the interference electrode in the sub-pixel on the first base at least partially overlaps with an orthographic projection of the first sub-electrode and/or the second sub-electrode on the first base.

15. A method of manufacturing a display device, the display device comprising: an array substrate and an opposite substrate which are oppositely arranged, and a liquid crystal layer located between the array substrate and the opposite substrate, and the display device comprises a plurality of sub-pixels arranged in an array; wherein the method comprises:
manufacturing the array substrate, wherein the array substrate comprises: a first base, and a first electrode and a second electrode of each of the plurality of sub-pixels, the first electrode and the second electrode are located on a side of the first base proximal to the liquid crystal layer; and
manufacturing the opposite substrate, wherein the opposite substrate comprises: a second base, and an interference electrode of each of the plurality of sub-pixels, the interference electrode is located on a side of the second base proximal to the liquid crystal layer, and an orthographic projection of the interference electrode of each sub-pixel on the first base at least partially overlaps with an orthographic projection of the second electrode of said each sub-pixel on the first base; and
aligning and assembling the array substrate and the opposite substrate, and filling liquid crystal between the array substrate and the opposite substrate, wherein
the second electrode is a slit electrode; the first electrode and the second electrode are sequentially arranged along a direction departing from the first base; the slit electrode comprises a main portion and at least one opening portion;
the orthographic projection of the interference electrode in the sub-pixel on the first base at least partially overlaps an orthographic projection of the main portion of the slit electrode on the first base;
the main portion in each of the sub-pixels comprises a plurality of main sub-portions, a first connection portion, and a second connection portion; the plurality of main sub-portions are arranged at intervals, first ends of the plurality of main sub-portions are connected through the first connection portion, and second ends of the plurality of main sub-portions are connected through the second connection portion;
the interference electrode in each of the sub-pixels comprises at least one interference sub-electrode, and wherein
the method further comprises forming at least one support structure, the at least one support structure is disposed in one-to-one correspondence with the at least one interference sub-electrode, each support structure is located between the interference sub-electrode corresponding thereto and the second base, and the interference sub-electrode is located only on a side of the support structure away from the second base, a border of an orthographic projection of each interference sub-electrode on the second base coincides with a border of an orthographic projection of the support structure corresponding to said each interference sub-electrode on the second base.

* * * * *